UNITED STATES PATENT OFFICE.

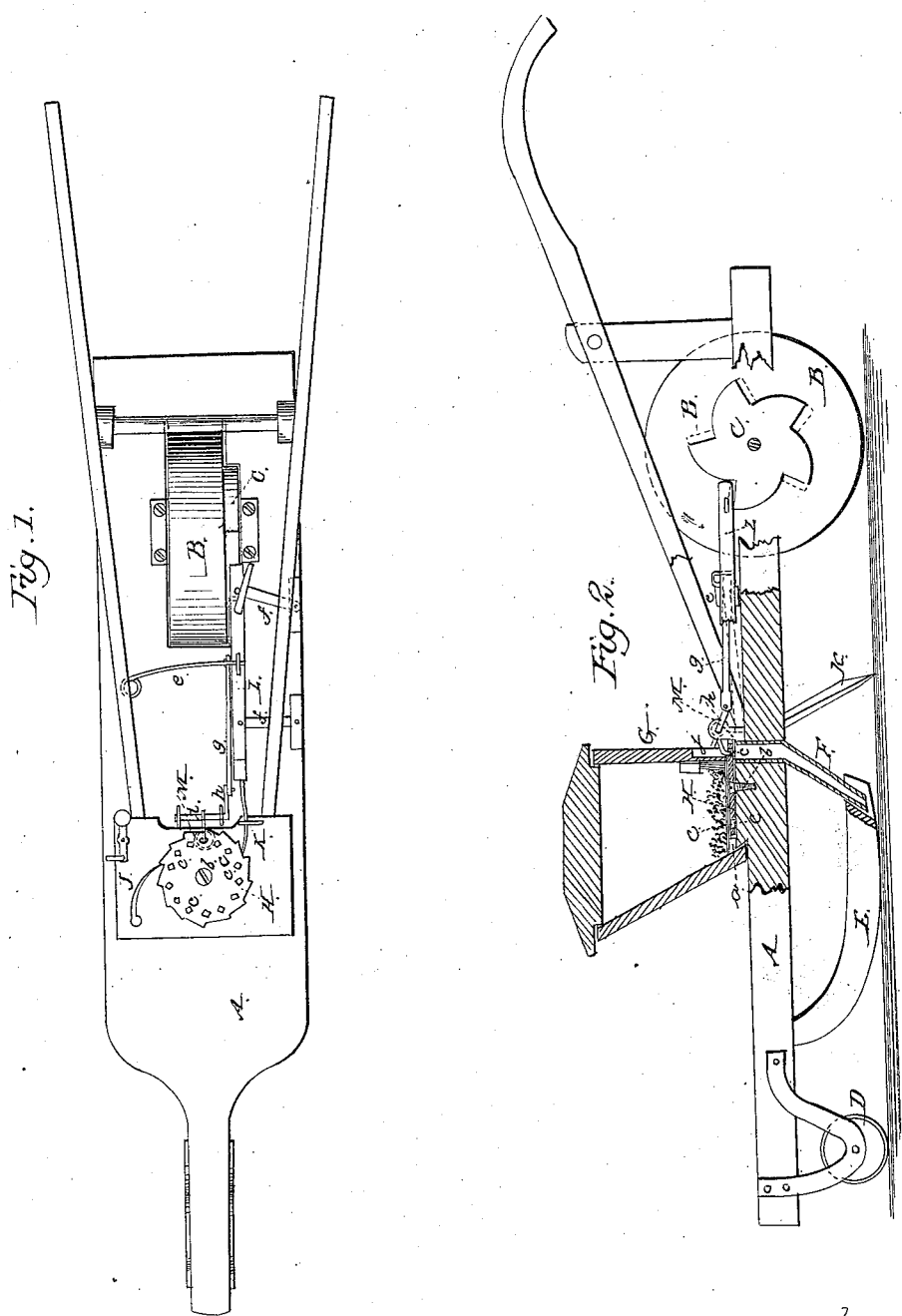

DAVID PARDEE, OF CARLYLE, ILLINOIS.

IMPROVEMENT IN SEEDING-MACHINES.

Specification forming part of Letters Patent No. 31,086, dated January 8, 1861.

*To all whom it may concern:*

Be it known that I, DAVID PARDEE, of Carlyle, in the county of Clinton and State of Illinois, have invented a new and Improved Seeding-Machine; and I do hereby declare that the following is a full, clear, and exact description of the same, reference being had to the annexed drawings, making a part of this specification, in which—

Figure 1 is a plan or top view of my invention with the seed box or hopper detached; Fig. 2, a side sectional view of the same.

Similar letters of reference indicate corresponding parts in the two figures.

To enable those skilled in the art to fully understand and construct my invention, I will proceed to describe it.

A represents a frame or bed piece of suitable dimensions, the back part of which is supported by a wheel, B, having a ratchet-shaped cam, C, attached concentrically to one side of it. The form of this cam is shown clearly in Fig. 2. The front part of the frame and bed piece A is supported by a small wheel, D.

To the under side of the frame or bed piece A there is attached a colter, E, which is of bent form resembling a sled-runner. The back end of the colter is divaricated to receive the lower end of the seed-conveying spout F, the upper part of which passes through the frame or bed piece A, as shown in Fig. 2.

On the frame or bed-piece A there is placed a seed box or hopper, G. The bottom $a$ of this seed-box is of sheet metal, and it has an opening in it of circular or approximate form to expose the face or upper side of a ratchet, H, the axis $b$ of which is secured vertically to the frame or bed piece A. The ratchet H is perforated near its periphery with holes $c$, which form seed-cells. The teeth of the ratchet are covered by the bottom $a$ of the seed box or hopper, but the greater portion of the holes $c$ are exposed. The bottom $a$ at the edge of its opening fits snugly on the ratchet, so as to prevent seed, dust, &c., working between the ratchet and the bottom, and the back edge of the opening may have a knife-edge, as shown at $d$, in order to scrape off all superfluous seed from the holes as the latter pass under it and out from underneath the hopper. The usual cut-off brush, I, is also employed and placed within the seed box or hopper at one side of the knife $d$ and directly over the path of the movement of the holes $c$. The upper end of the seed-conveying spout F is directly under the path of rotation of the holes $c$ at the outer side of the seed box or hopper.

J is a spring retaining-pawl, which engages with the ratchet H, and K is a spring or elastic pawl, which is attached to the front end of a slide-bar, L, the back end of which is kept in contact with the face of the cam C by means of a spring, $e$. The slide-bar L is attached to pivoted arms $ff$, which serve as guides for the bar.

To the bar L there is attached a pitman, $g$, the front end of which is connected to a crank, $h$, at the end of a small shaft, $i$, the bearings of which are at the upper ends of small uprights on the bed or frame A.

To the shaft $i$ a hook-shape rod, M, is attached. This rod serves as a clearer, and its outer parts work through the holes $c$, the rod M being of such a length and so bent as to permit of such a result, and a recess, $j$, being in the back board of the seed box or hopper to allow the rod to work therein and pass through the holes $c$. (See Fig. 2.)

To the under side of the frame or bed piece A there are attached two drag-teeth or coverers, $k\,k$, which are placed directly behind the spout F.

As the machine is drawn along the colter E cuts all weeds, trash, &c., that may lie in its path and opens a furrow to receive the seed which descends through the spout F. As the wheel B rotates the cam C and springs $e$ give a reciprocating movement to the slide L, and the pawl K actuates the ratchet H, rotating or moving it the distance of a tooth at each forward movement of the slide L, and at each movement bringing a filled hole or seed-cell $c$ over the orifice of the spout F. During the forward movement of the slide L and the movement of the ratchet H the clearer M is elevated in consequence of the pitman $g$ turning the shaft $i$ through the medium of the crank $h$, and during the backward movement of the slide L, which is produced by the spring $e$, the clearer M is forced down through the hole $c$ over the spout F and the seed driven from the hole into the spout. Thus it will be seen that the holes or seed-cells $c$ are prevented from clogging or choking. The drags $k\,k$ cover the seed.

I do not claim the colter E, for that has been previously used, nor do I claim a horizontal rotating seed-distributing disk; but I do claim as new and desire to secure by Letters Patent—

The arrangement of the perforated ratchet distributing-wheel H, cut-off brush I, spring-pawl J, spout F, colter E, and hopper G with the sliding bar L, springs K $e$, arm $g$, cam C, pivoted guides $f\ f$, shaft $i$, hook-arm M, and recess $j$, all as herein shown and described.

DAVID PARDEE.

Witnesses:
JAS. WIGHTMAN,
J. W. MADDUX.